Figure 1:
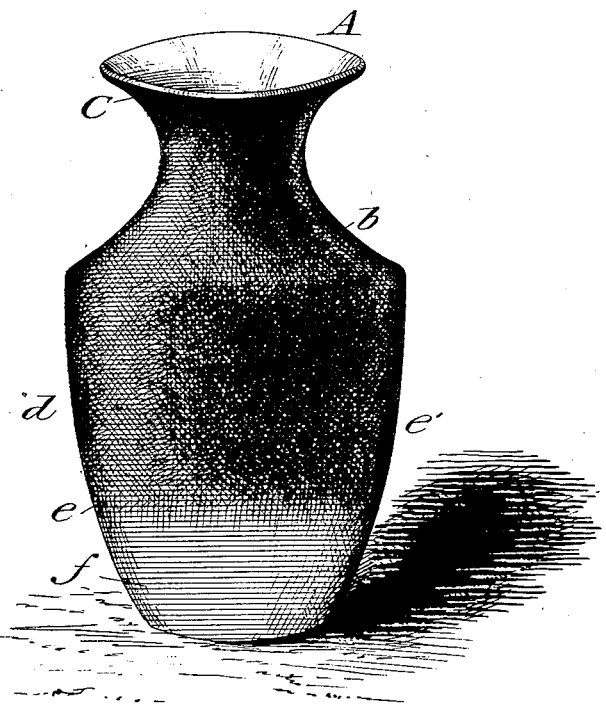

(Specimens.)

F. S. SHIRLEY.
GLASSWARE AND FINISHING THE SAME.

No. 344,415. Patented June 29, 1886.

Witnesses:
Chas. F. Swift
J. Canty

Inventor:
Fredk S. Shirley

UNITED STATES PATENT OFFICE.

FREDERICK S. SHIRLEY, OF NEW BEDFORD, MASSACHUSETTS.

GLASSWARE AND FINISHING THE SAME.

SPECIFICATION forming part of Letters Patent No. 344,415, dated June 29, 1886.

Application filed December 15, 1885. Serial No. 185,770. (Specimens.)

*To all whom it may concern:*

Be it known that I, FREDERICK S. SHIRLEY, a citizen of the United States, residing at New Bedford, in the county of Bristol and State of Massachusetts, have invented certain new and useful Improvements in Fancy Glassware and Finishing same, of which the following is a specification, reference being had to the accompanying drawings.

My invention relates to an improvement in the manufacture of ornamental glassware composed of two or more body glasses combined in one article, as more fully described hereinafter; and it consists, first, in the composition of the mixtures or batch and preparation of same for the special uses intended; second, in the method or process of producing the articles from the metal when melted from such compounds; third, the method or process of producing an ornamentation between the walls of shaded articles of glassware; fourth, in the articles produced from such glasses; fifth, in the finishing such articles by making the surface lusterless and giving it appearance of velvet or peach-like skin.

In practicing my invention I compound a glass-mixture or batch of materials as known to the arts, and then treat this base or stock so as to produce two or more glasses of different natures and colors or of same color, but so temper each kind as to render them sufficiently like or analogous to each other that they will practically assimilate and work together in one article, which is a necessity for the successful working of this invention. By this means I am able to produce shaded glassware of almost any color, and show a variety of effects never before produced in one article and differing in appearance from any glassware known before this invention. To illustrate this I give the following formula as one of the mixtures that can be used for this purpose, and by this all skilled in the art can compound mixtures for other colors and effects they may desire to obtain: I take three hundred pounds of white quartz sand, three hundred and twenty-five pounds of red oxide of lead, twenty-eight pounds of carbonate of potash, thirty-eight pounds of niter, (all avoirdupois weights,) and mix these ingredients all thoroughly together. This forms a well-known base or stock for glass practically colorless. Of this mixture I take three hundred pounds and add thereto four and one-half pounds of kaolin, fifteen ounces of fluor-spar, two and one-half pounds of white oxide of antimony, one pound of sulphite of antimony, one and one-fourth pound of manganese, four ounces of white arsenic. When mixed, I add ten pennyweights of refined gold in a solution of aqua-regia, and again mix the batch thoroughly, so as to diffuse the coloring ingredients. This formula will produce an extremely sensitive glass having a color resident therein that can be readily developed into several shades of color by being cooled to a certain degree below a glowing heat and then reheated. By this means all that portion which has been chilled will on reheating develop various colors and shades of color—such as purple, blue, rose, and maroon color—according to extent it has been chilled. The metal or glass, when melted, will be a transparent glass of a greenish straw color. If desired, it can be made more of a golden color by the addition of antimony sulphite; or the straw color can be made deeper by reheating the metal when gathered, care being taken not to let it chill below a bright red or glowing heat, or it will develop an entirely different color, as above stated. In describing this mixture I call it No. 1 hereinafter.

For the second or No. 2 glass-mixture I take three hundred pounds of the same batch or stock and add thereto nine and one-half pounds of phosphate of lime, six pounds of white arsenic, two and one-half ounces of oxide of manganese. Should the No. 1 mixture be rendered darker by an increase of the sulphite of antimony, which material has a tendency to render the glass hard and brittle, there must be an equivalent hardening material added to the second or No. 2 batch or mixture, and an increase of lime will be found to effect this object, preference being given to carbonate of lime for this purpose, as too large an amount of phosphate will cause the glass to be rough and lumpy. This mixture when melted will produce a white-body glass, more or less opaque, or by addition of coloring-oxide it may be made other colors; or should it be desired to have this second or No. 2 body transparent it can be used so and assimilated to the other or No. 1 glass body by adding any required coloring ingredient and the carbonates of lime and potash in suitable proportions, which will be governed by the fact as to whether the coloring ingredients used (that is, where large quantities are required to effect the purpose desired) are of a hardening or softening nature. It is obvious to all glassmakers that the order of these glasses may be reversed, and the opaque body rendered sensitive and contain the resident color to be developed and the casing-metal made non-sensitive, and the effects varied without departing from the spirit of my invention.

The method or process of working these glasses to obtain the desired results is as follows: The workman will take his blow-pipe and gather about three-fourths sufficient metal to make the article required from the No. 2 or white-body glass-mixture, and after slightly blowing and truing same on the iron will take a gathering of the metal from the No. 1 mixture or transparent body-glass, which is a sensitive glass capable of being developed into differing colors during the working. This is manipulated so as to coat or thoroughly incase the first gathering, and when blown out forms a skin or film over the whole article, which skin can be made thicker or thinner, according to the amount of metal gathered or size the article is expanded to. After this second gathering the workman proceeds to form the article in the manner known to the art, taking especial care not to let the metal chill below a glowing heat on all that part which he desires to keep to the original color of the metal forming the skin or casing. After one end of the article is completed, the workmen will then reverse it by attaching the finished end to a post or punty, and detach it from the blowing-iron and finish the article by reheating and forming the part detached from the blowing-iron, which will have become chilled, and in reheating to finish the required form the shell or skin of sensitive glass will develop the colors resident therein, which in this case will be a bright rose color, and if sufficiently chilled and reheated will develop a maroon tint, the rose color passing farther down the body of the article, and gradually shading into the original color of the casing, which will be set off by the inner coat or body of white glass, thus forming an article of beautiful shades of color with an opaque or transluscent backing, the colors being dependent on the skill and taste of the workman, as if worked rapidly, so as to cool but slightly, a blue shading into a greenish tint may be obtained from this same body-casing.

The accompanying drawings illustrate the article and its construction.

Figure 2:
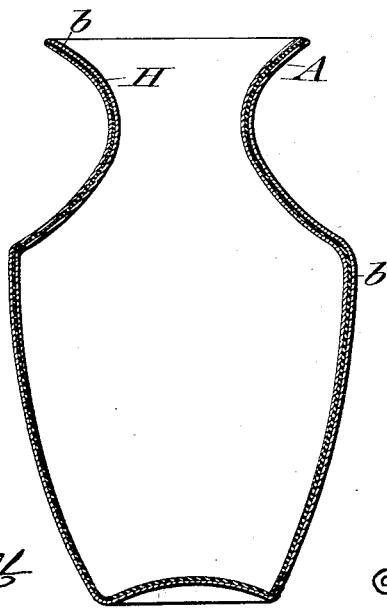

Figure 1 exhibits the article composed of an inner body of dense or translucent glass, that may be of white or other color, A, and having an outer coating of sensitive glass, b b b, showing the developed color C, shading off into the other colors or tints, d e, into the original body-color of casing f. Fig. 2 shows a section of same article, exposing the layers or coats of glass more distinctly, the same letters showing same relative parts. I also produce shaded articles from a combination of glasses without making either of the bodies sensitive, and yet attain similar results. To effect this I divide my base or stock, coloring each portion as desired, and assimilating their natures, as before described, having one of a fixed transparent body-color, and the other of an opaque or semi-opaque body. To work these the workman will gather a small portion of the transparent body-glass and blow same in a bulbous form to an extent technically known as "blowing through toward the end of bulb." This he will open up and form an open-ended cup, or tunnel-shape piece, the walls of which will be of extreme thinness on the end and gradually thicken to considerable thickness toward the iron. The workman's assistant will then gather sufficient metal from the second glass (of semi-opaque metal) and drop into this cup, which is held perpendicular for this purpose, the assistant removing the gathering iron and surplus glass, while that in the cup on blowing-iron is reheated and formed into one mass, and then partially blown out, and the article formed in the usual manner; or, if desired, the whole mass may be again coated or covered by a third shell or skin, either of clear flint glass or of transparent color, the combination of the two changing that of the first shell. The article would have three coats, as indicated in Fig. 1 by the additional letter H, at the upper portion, but only two coats below the letter e', which would also be the limit of the color or shading obtained from the first skin or casing; or this same non-sensitive colored glass can be used, by the workman, forming a cup and blowing the bottom portion through to extreme thinness and leaving the upper part gradually thickened toward the top. He will then fill this with the interior body-casing, and the article formed as first described, except as to the developing the color, as the shading in this case is produced by the thickness of the glass being gradually reduced and the backing showing through the thinner portions more distinctly, and thus shows the varying shades desired from the deep to almost colorless shades.

I also produce varied and beautiful effects by having the workman take the metal first gathered after slightly blowing same, and, while still soft, impressing it with a reticulated pattern in a suitable mold, which will produce deep recesses or impression in the surface of glass. This is then covered by the casing of sensitive glass or colored-glass body, which adheres to the prominent surfaces of the metal first gathered and incloses the air in the recesses formed by the imprint of the mold. The article is then formed and worked into shape, as described, the pattern being incased between the shells forming the body and showing beautiful and brilliant effects; and still further beautiful effects are produced on these articles made from these combined glasses by finishing same with a lusterless surface, which can be produced by an acid roughing-dip or by sand-blast or similar abrading means, which will give the surface a velvet-like finish or an appearance resembling the skin of a peach, where the glass has a shaded effect, and a pearl-like appearance is combined with this wherever the reticulated or other pattern is incased in the walls of the article. By spotting or splashing the surface with protecting varnish or wax a granular effect can also be produced by dipping into fluoric and deading acid alternately; and combinations of these finishes will all produce new results.

I am aware of glasses of various kinds and colors being cased or flashed over each other in one or more coats, and being cut through by cutting-wheels to show ornamental effects, but each coat or shell being of uniform color and of one color throughout. I also know of glasses of two colors being joined together endwise and worked into articles of glassware; but these have a distinctly defined line of jointure, and I do not claim these, the same being old and well-known; but, Having described my invention, what I claim is—

1. Glass batches or mixtures of different natures, one being of a fixed color throughout and the other of a sensitive nature and producing varied colors in the process of working, both being rendered analogous in temper, to work in combination with each other, by the addition of suitable chemicals, substantially as described.

2. The combination of a glass of fixed color or white body-glass with a sensitive-body glass in which the inherent color can be developed in the process of working, substantially as described.

3. The method or process of making articles of glassware by forming a core or body of non-sensitive glass, incasing this core or body with a coating or shell of sensitive glass, and forming the article therefrom and developing colors on certain portions of the article, substantially as described.

4. The method or process of making articles of glassware from two or more glasses of differing colors by forming a core or body of non-sensitive glass, impressing same in suitable molds for creating reticulated or other determined patterns therein, then incasing the ornamented body or core in a coat or shell of sensitive glass, and sealing the air within the impressed pattern, and then forming the article, substantially as described.

5. As a new article of manufacture, glassware having an interior body of non-sensitive glass incased in a shell or skin of sensitive glass, the surface being shaded from one color to another, substantially as described.

6. As a new article of manufacture, glassware having a translucent or opaque body, interior body, and an exterior shell or skin of one color shading into another color or lighter tints of the same color, substantially as described.

7. As a new article of manufacture, glassware having an interior body of one color and an exterior shell of sensitive glass shading from one color to another, with an ornamental pattern inclosed between the shells or skins, substantially as described.

8. As a new article of manufacture, glassware formed of two or more shells of glass, the body portions of which present different colors or shades of color blended together, the surface being finished in a lusterless skin, substantially as described.

In testimony whereof I affix my signature in presence of two witnesses.

FREDERICK S. SHIRLEY.

Witnesses:
GEO. B. CASE,
ROBT. G. TOBEY.